United States Patent
Okuno

(10) Patent No.: US 10,244,138 B2
(45) Date of Patent: *Mar. 26, 2019

(54) CONTENT PROCESSING APPARATUS

(71) Applicant: BROTHER KOGYO KABUSHIKI KAISHA, Nagoya-shi, Aichi-ken (JP)

(72) Inventor: Tetsuya Okuno, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/050,466

(22) Filed: Jul. 31, 2018

(65) Prior Publication Data
US 2018/0338058 A1 Nov. 22, 2018

Related U.S. Application Data

(63) Continuation of application No. 15/394,928, filed on Dec. 30, 2016, now Pat. No. 10,057,447.

(30) Foreign Application Priority Data

Aug. 22, 2016 (JP) ................... 2016-161635

(51) Int. Cl.
*H04N 1/00* (2006.01)
*H04N 1/04* (2006.01)
*G05B 19/042* (2006.01)

(52) U.S. Cl.
CPC ....... *H04N 1/00962* (2013.01); *G05B 19/042* (2013.01); *H04N 1/00039* (2013.01);
(Continued)

(58) Field of Classification Search
USPC ................................ 358/1.1–1.18
See application file for complete search history.

(56) References Cited

U.S. PATENT DOCUMENTS 5,751,996 A   3/1998  Glew et al.
7,380,206 B1*  5/2008  Usuda ............... H04H 20/28
                                          348/E5.104

(Continued)

FOREIGN PATENT DOCUMENTS

JP    2004-46802 A    2/2004
JP    2012-113700 A   6/2012

OTHER PUBLICATIONS

Notice of Allowance dated Apr. 20, 2018 from parent U.S. Appl. No. 15/394,928.

*Primary Examiner* — Marcellus Augustin
(74) *Attorney, Agent, or Firm* — Scully, Scott, Murphy & Presser, PC

(57) ABSTRACT

A content processing apparatus includes a content processing device, a controller and an apparatus memory storing therein a program including an analysis module, a first obtaining module and a second obtaining module. The analysis module causes the apparatus to perform an extraction processing, a first determination processing, a first obtaining processing, a second obtaining processing, a second determination processing, a display processing, a reception processing and an operation instruction processing. The first obtaining module causes the content processing apparatus to perform a transmission processing, a reception processing and a first transfer processing. The second obtaining module causes the content processing apparatus to perform an obtaining processing and a second transfer processing.

10 Claims, 9 Drawing Sheets

```
scan_upload1.xml
<screen>
    <next_url>file://localhost/scan_upload2.xml</next_url>
    <title>resolution selection screen</title>
    <option_display key="resolution">
        <option val="1">300dpi</option >
        <option val="2">600dpi</option >
    </option_display>
    <log_obtaining/>
</screen>
```

```
scan_upload2.xml
<screen>
    <next_url>fuile:///scan_upload3.xml</next_url>
    <title>type selection screen</title>
    <option_display key="file_type">
        <option val="1">estimate sheet</option >
        <option val="2">bill</option >
    </option_display>
    <log_obtaining/>
</screen>
```

(52) U.S. Cl.
CPC ..... *H04N 1/00344* (2013.01); *H04N 1/00411* (2013.01); *H04N 1/04* (2013.01); *G05B 2219/2646* (2013.01); *H04N 2201/0094* (2013.01)

(56) References Cited

U.S. PATENT DOCUMENTS

| | | | |
|---|---|---|---|
| 7,551,303 B2* | 6/2009 | Hikawa | H04N 1/00209 358/1.13 |
| 7,784,024 B2 | 8/2010 | Takashima et al. | |
| 8,578,013 B2 | 11/2013 | Ghosh et al. | |
| 9,760,647 B2 | 9/2017 | Angrish et al. | |
| 2003/0231343 A1 | 12/2003 | Kobayashi et al. | |
| 2009/0158257 A1* | 6/2009 | Xu | G06F 11/362 717/129 |
| 2012/0069376 A1* | 3/2012 | Tsujimoto | H04N 1/00244 358/1.13 |
| 2012/0113468 A1 | 5/2012 | Urakawa | |
| 2016/0021041 A1* | 1/2016 | Zacharias | H04L 51/10 709/203 |
| 2016/0094728 A1* | 3/2016 | Saito | H04N 1/00204 358/1.15 |
| 2016/0094753 A1 | 3/2016 | Miyazawa | |

* cited by examiner

FIG. 3A scan_upload1.xml

```
<screen>
    <next_url>http://www.server_a.com/scan_upload2.xml</next_url>
    <title>resolution selection screen</title>
    <option_display key="resolution">
        <option val="1">300dpi</option >
        <option val="2">600dpi</option >
    </option_display>
</screen>
```

FIG. 3B scan_upload2.xml

```
<screen>
    <next_url>http://www.server_a.com/scan_upload3.xml?resolution=2</next_url>
    <title>type selection screen</title>
    <option_display key="file_type">
        <option val="1">estimate sheet</option >
        <option val="2">bill</option >
    </option_display>
</screen>
```

FIG. 3C scan_upload3.xml

```
<command>
    <scan_upload>
        <resolution>600dpi</resolution>
        <format>pdf</format>
        <server>ftp://www.server_c.com</server>
    </scan_upload>
</command>
```

FIG. 4A
scan_upload1.xml

```xml
<screen>
    <next_url>file://localhost/scan_upload2.xml</next_url>
    <title>resolution selection screen</title>
    <option_display key="resolution">
        <option val="1">300dpi</option>
        <option val="2">600dpi</option>
    </option_display>
    <log_obtaining/>
</screen>
```

FIG. 4B
scan_upload2.xml

```xml
<screen>
    <next_url>fuile:///scan_upload3.xml</next_url>
    <title>type selection screen</title>
    <option_display key="file_type">
        <option val="1">estimate sheet</option>
        <option val="2">bill</option>
    </option_display>
    <log_obtaining/>
</screen>
```

FIG. 4C
scan_upload3.xml

```xml
<command>
    <scan_upload>
        <script>
            if%%evtparam("resolution")%%="1"
                <resolution>300dpi</resolution>
            else
                <resolution>600dpi</resolution>
            end
        </script>
        If%%evtparam("file_type")%%="1"
            <format>pdf</format>
        else
            <format>tiff</format>
        end
        </script>
        <server>ftp://www.server_c.com</server>
    </scan_upload>
</command>
```

FIG. 4D
log information

```xml
<evtparam>
    <resolution>2</resolution>
</evtparam>

<evtparam>
    <file_type>1</file_type>
</evtparam>
```

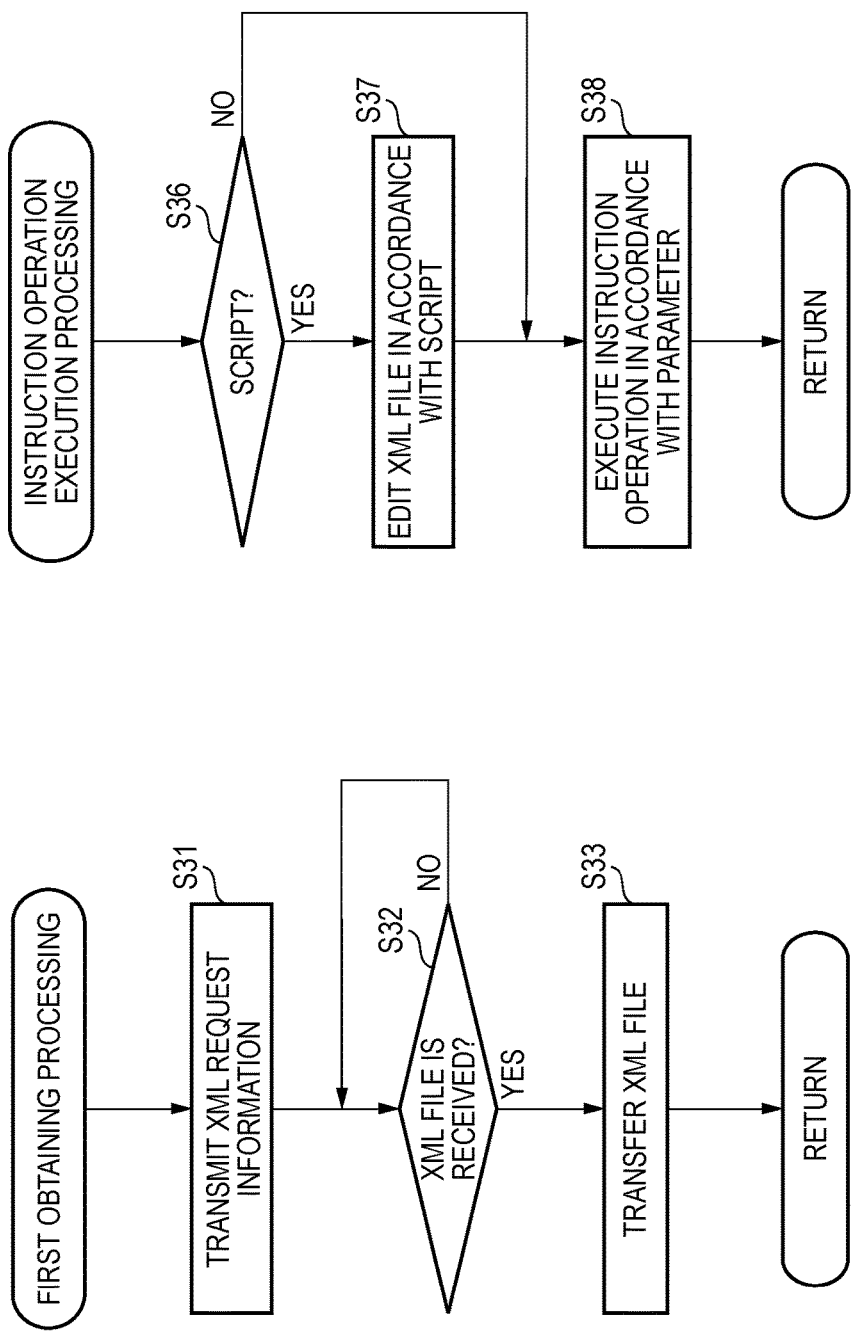

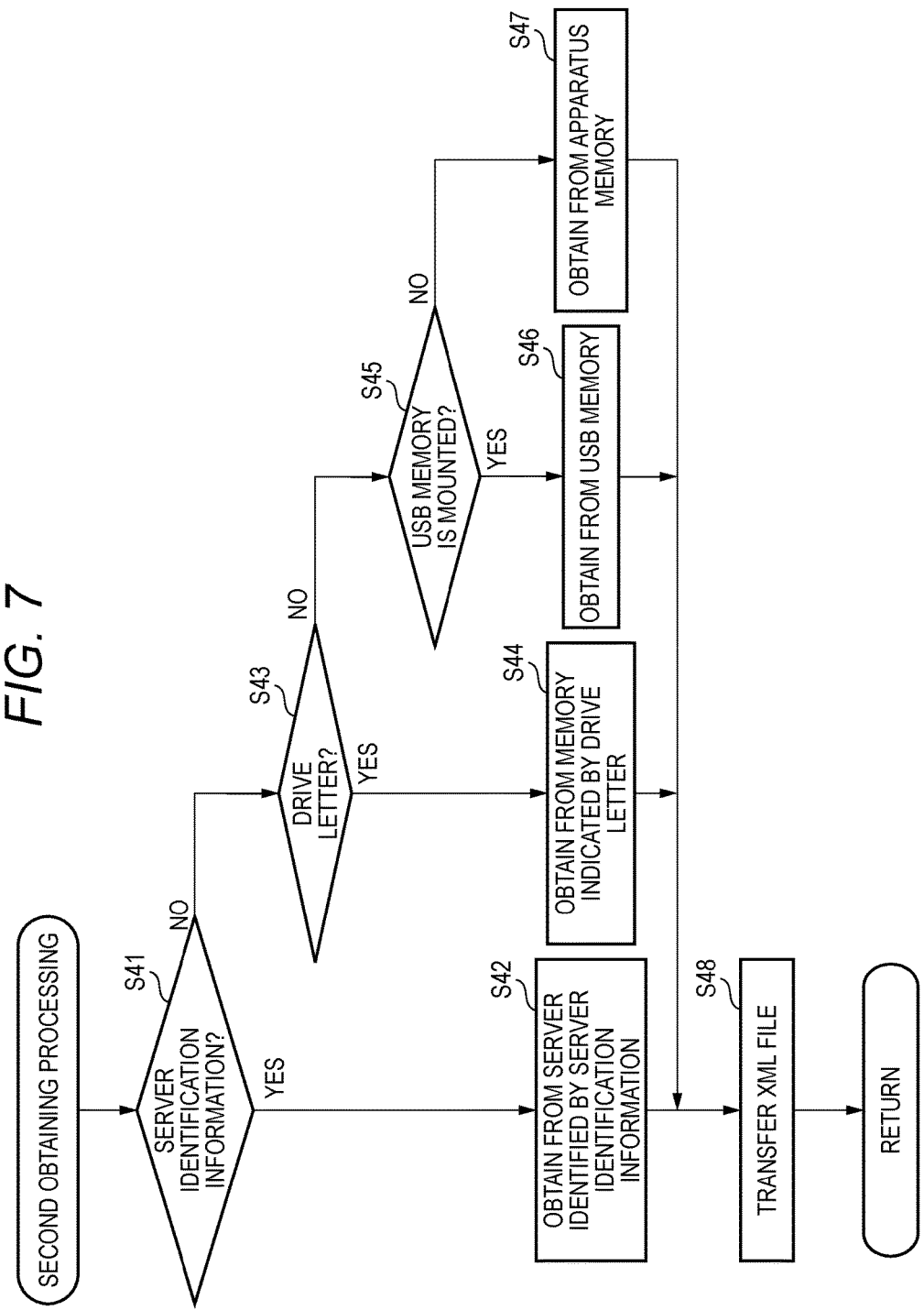

CONTENT PROCESSING APPARATUS

CROSS-REFERENCE TO RELATED APPLICATION

This application is a continuation application of U.S. Ser. No. 15/394,928 filed on Dec. 30, 2016 and claims priority from Japanese Patent Application No. 2016-161635 filed on Aug. 22, 2016, the entire subject-matter of each of which is incorporated herein by reference.

BACKGROUND

The disclosure relates to a content processing apparatus configured to process content data by executing processing instructed by each of a plurality of instruction data to be sequentially obtained.

There has been disclosed a terminal apparatus configured to repeatedly execute processing of receiving instruction data from a server and processing of executing an operation instructed by the received instruction data. The terminal apparatus can use services (for example, upload or download of a file), which are to be supplied by the server, by repeating the processing.

SUMMARY

In recent years, it is needed to customize and use services provided by the above-described related-art system. However, since the server provided on the Internet is accessed by a plurality of unspecified terminal apparatuses, the server can just transmit the common instruction data to all the terminal apparatuses.

Therefore, it is considered to preserve customized instruction data at a place different from the server having the common instruction data stored therein and to obtain the instruction data from the place. However, a protocol of obtaining the instruction data is different for each obtain source. Therefore, if a program of the terminal apparatus is to be developed for each obtain source of the instruction data, a development burden increases.

Therefore, illustrative aspects of the disclosure provide a content processing apparatus configured to use services, which are to be implemented by a plurality of instruction data, and having a program capable of receiving the instruction data from a plurality of obtain sources.

The disclosure provides a variety of forms. A content processing apparatus according to one illustrative aspect of the disclosure comprises: a content processing device, which is hardware configured to execute a content processing operation for content data; a display; an input interface; a communication interface; a controller; and an apparatus memory storing therein a program which, when executed by the controller, causes the content processing apparatus to perform operations, the program comprising an analysis module, a first obtaining module and a second obtaining module. The analysis module, when executed by the controller, causes the content processing apparatus to perform: extracting location information indicative of a location of instruction data; determining a setting value of protocol information included in the extracted location information; obtaining the instruction data comprising: when it is determined that the setting value of the protocol information is a first value, designating the extracted location information as an argument, calling the first obtaining module, and obtaining the instruction data indicated by the location information from the first obtaining module; and when it is determined that the setting value of the protocol information is a second value, designating the extracted location information as an argument, calling the second obtaining module, and obtaining the instruction data indicated by the location information from the second obtaining module; and determining whether the obtained instruction data is screen instruction data or operation instruction data, the screen instruction data being for displaying an instruction screen including a plurality of parameters, and the operation instruction data being for instructing the content processing device to execute the content processing operation. When it is determined that the obtained instruction data is the screen instruction data, the analysis module, when executed by the controller, is configured to: cause the content processing apparatus to perform: displaying the instruction screen expressed by the screen instruction data on the display; receiving a user operation of designating one of the plurality of parameters included in the instruction screen through the input interface; extracting the location information indicative of a location of next instruction data from the instruction data obtained from the first obtaining module or the second obtaining module; and designate the extracted location information and the designated parameter as the argument, in the obtaining of the instruction data after performing the receiving of the user operation. When it is determined that the obtained instruction data is the operation instruction data, the analysis module, when executed by the controller, causes the content processing apparatus to perform: causing the content processing device to perform the content processing operation indicated by the operation instruction data, in accordance with an execution condition corresponding to the parameter designated by the user operation. The first obtaining module called by the analysis module, when executed by the controller, causes the content processing apparatus to perform: transmitting transmission request information to a server through the communication interface in accordance with a first protocol, the transmission request information requesting transmission of the instruction data indicated by the location information obtained as the argument, the transmission request information comprising the parameter when the parameter is obtained as the argument. The first obtaining module, when executed by the controller, causes the content processing apparatus to perform: receiving the instruction data, which is a response to the transmission request information, from the server through the communication interface in accordance with the first protocol; and transferring the received instruction data to the analysis module. The second obtaining module called by the analysis module, when executed by the controller, causes the content processing apparatus to perform: obtaining the instruction data, which is indicated by the location information obtained as the argument, from an obtain source different from the server in accordance with a second protocol, the second protocol being different from the first protocol; and transferring the obtained instruction data to the analysis module.

According to the above configuration, the instruction data is obtained from the obtain sources different from each other by the first obtaining module and the second obtaining module, which are to be called by designating the common argument. The analysis module is preferably configured to execute the common processing for the instruction data obtained in the first obtaining processing and the second obtaining processing. In this way, the protocols different for each obtain source are mounted on the obtaining modules and the common processing of analyzing the instruction data is mounted on the analysis module, so that it is possible to implement the content processing apparatus capable of obtaining the instruction data from the plurality of obtain sources at low development cost.

BRIEF DESCRIPTION OF THE DRAWINGS

Illustrative aspects of the disclosure will be described in detail with reference to the following figures wherein:

FIGS. 3A to 3C depict examples of instruction data to be stored in a server 70;

FIGS. 4A to 4C depict examples of the instruction data to be stored in an obtain source different from the server 70, and FIG. 4D depicts an example of log information;

FIG. 6A is a flowchart of first obtaining processing, and FIG. 6B is a flowchart of instruction operation execution processing;

FIG. 7 is a flowchart of second obtaining processing;

FIGS. 8A and 8B depict display examples of a display 23, in which FIG. 8A depicts a PG selection screen, and FIG. 8B depicts a resolution selection screen;

FIGS. 9A and 9B depict display examples of the display 23, in which FIG. 9A depicts a type selection screen, and FIG. 9B depicts an extended PG selection screen.

DETAILED DESCRIPTION

Hereinafter, an illustrative embodiment of the disclosure will be described with reference to the drawings. Incidentally, the illustrative embodiment to be described later is just an example of the disclosure and the illustrative embodiment of the disclosure can be appropriately changed without departing from the gist of the disclosure. For example, an execution sequence of each processing to be described later can be appropriately changed without departing from the gist of the disclosure.

Figure 1:
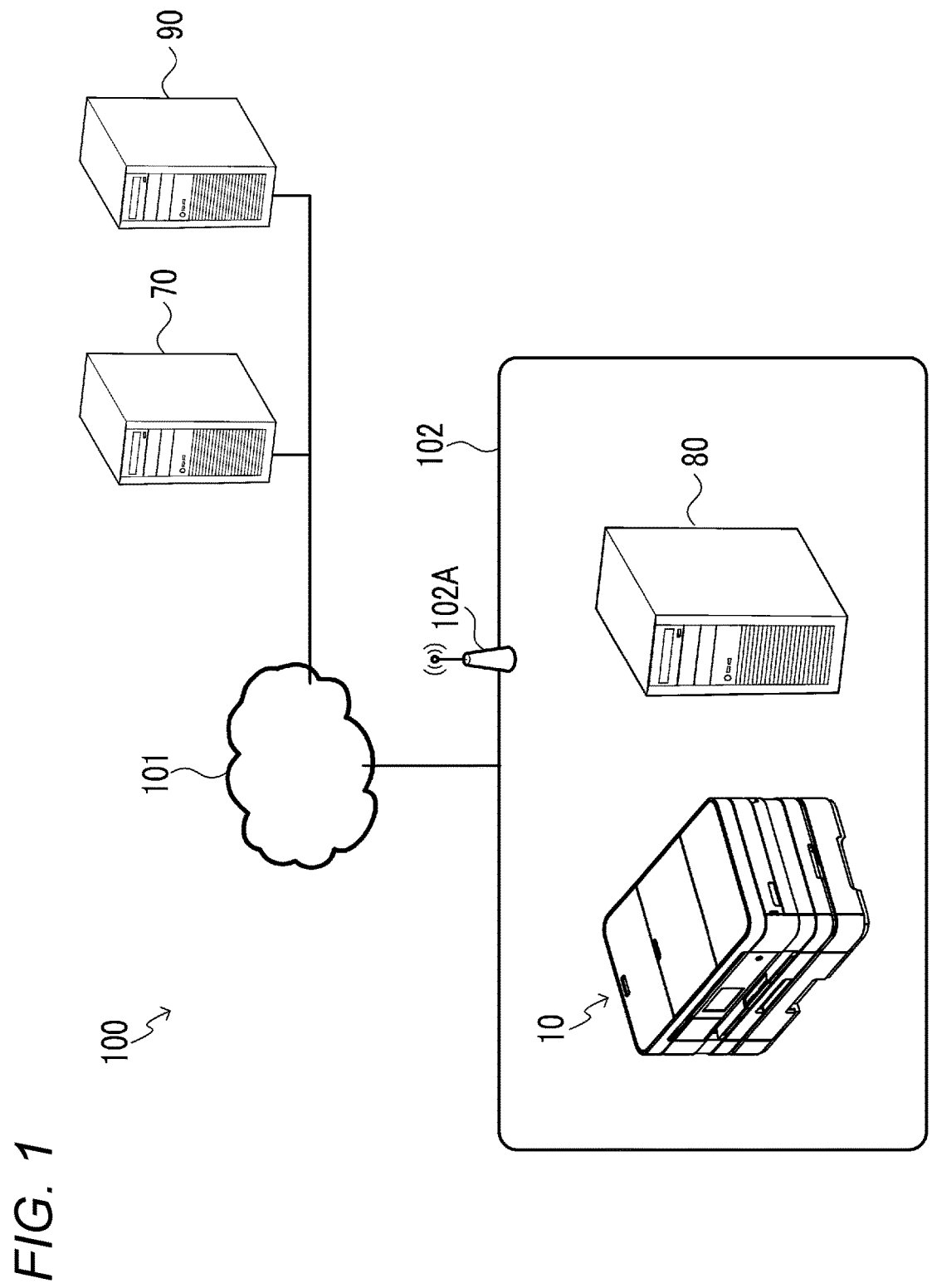
FIG. 1 depicts an outline of a system 100 in accordance with an illustrative embodiment.

FIG. 1 depicts an outline of a system 100 in accordance with the illustrative embodiment. The system 100 shown in FIG. 1 includes an MFP (abbreviation of Multi Function Peripheral) and servers 70, 80, 90. The MFP 10 and the servers 70, 80, 90 are configured to perform communication with each other via a communication network. Although the specific example of the communication network is not particularly limited, the communication network may be the Internet 101, a wired LAN, a wireless LAN 102 or a combination thereof.

The MFP 10 and the server 80 belong to the wireless LAN 102. That is, the MFP 10 and the server 80 can perform communication with each other via an access point (not shown) of the wireless LAN 102. Also, the wireless LAN 102 is connected to the Internet 101 via a router 102A. Also, the servers 70, 90 are connected to the Internet 101. That is, the MFP 10 can perform communication with the servers 70, 90 via the Internet 101 from the router 102A. Incidentally, the arrangement of the servers 70, 80, 90 is not limited to the example of FIG. 1.

Figures 2A, 2B:
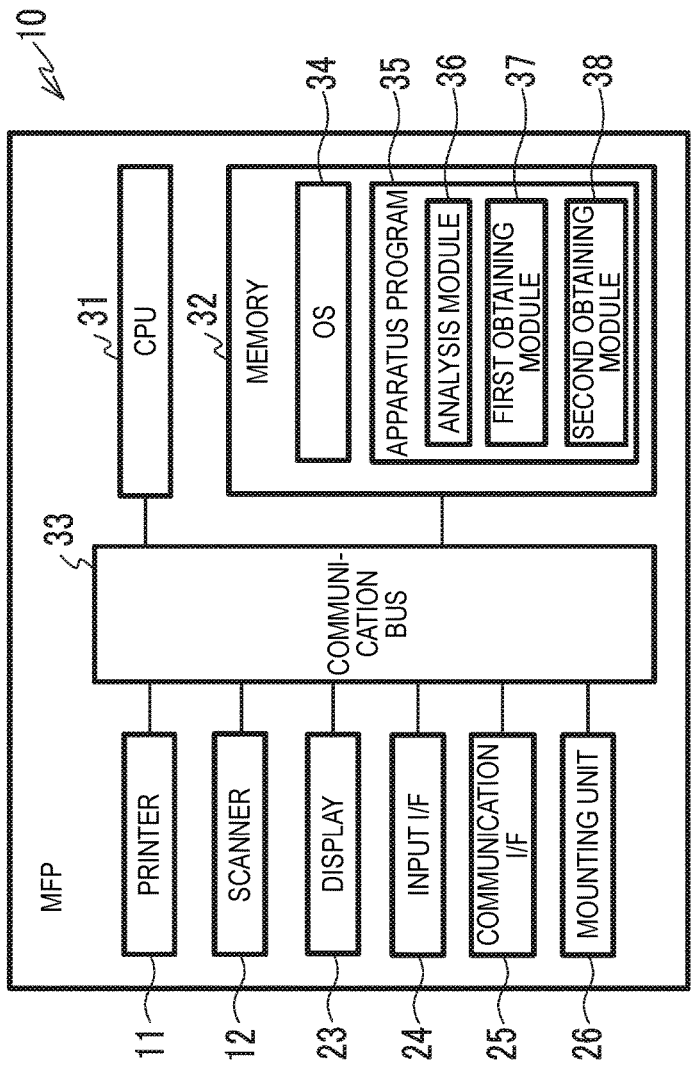
FIG. 2A is a block diagram of an MFP 10.
FIG. 2B depicts an example of a program list to be stored in a memory 32.

As shown in FIG. 2A, the MFP 10 mainly has a printer 11, a scanner 12, a display 23, an input I/F 24, a communication I/F 25, a mounting unit 26, a CPU 31, a memory 32, and a communication bus 33. The respective constitutional elements of the MFP 10 are connected each other through the communication bus 33. The MFP 10 is an example of the content processing apparatus.

The printer 11 is the hardware configured to execute a print operation of recording an image expressed by image data onto a sheet. As a recording method of the printer 11, a well-known method such as an inkjet method and an electrophotographic method can be adopted. The scanner 12 is the hardware configured to execute a scan operation of reading an image recorded on a document and generating image data (hereinafter, referred to as "scan data"). The printer 11 and the scanner 12 are examples of the content processing unit. The print operation and the scan operation are examples of the content processing operation. The image data, which is a target of the print operation, and the image data, which is to be generated in the scan operation, are examples of the content data.

The content processing unit, the content processing operation and the content data are not limited to the above-described examples. A sewing machine configured to execute an embroidery operation of sewing threads on a cloth in accordance with embroidery data is another example of the content processing unit. That is, the embroidery operation is another example of the content processing operation, and the embroidery data is another example of the content data. A speaker configured to execute an output operation of outputting voice in accordance with voice data is another example of the content processing unit. That is, the output operation is another example of the content processing operation, and the voice data is another example of the content data.

The input I/F 24 is a user interface configured to receive a user's input operation. Specifically, the input I/F 24 has buttons, and is configured to output a variety of operation signals associated with the pushed buttons to the CPU 31. Also, the input I/F 24 may have a film-shaped touch sensor superimposed on a display surface of the display 23. An operation of designating an object displayed on the display surface of the display 23 and an operation of inputting a character string or a number string are examples of the user operation. The "object" indicates a character string, an icon, a button, a link, a pull-down menu and the like displayed on the display 23.

The input I/F 24 implemented as a touch sensor is configured to output position information, which indicates a position on the display surface touched by the user. Meanwhile, in the specification, the term "touch" includes all operations of enabling an input medium to contact the display surface. Also, even when the input medium is not in contact with the display surface, "hover" or "floating touch" of bringing the input medium close to a position at which a distance to the display surface is very small may be included in the concept of the "touch". Also, the input medium may be a user's finger, a touch pen or the like. A user operation of tapping a position of an icon displayed on the display 23 is an example of the designation operation of designating the icon.

The communication I/F 25 is an example of the communication interface for performing communication with an external apparatus through the communication network. That is, the MFP 10 is configured to transmit a variety of information to the servers 70, 80, 90 through the communication I/F 25 and to receive a variety of information from the servers 70, 80, 90 through the communication I/F 25. The specific communication protocol of the communication I/F 25 is not particularly limited but Wi-Fi (a registered trademark of Wi-Fi Alliance) may be adopted, for example.

The mounting unit 26 is configured so that a portable memory is detachably mounted thereto. The MFP 10 can detect whether the portable memory is mounted to the mounting unit 26. Also, the MFP 10 can read out information stored in the portable memory mounted to the mounting unit 26. A USB flash drive (also known as a USB memory), an SD card and the like are examples of the portable memory. Also, the mounting unit 26 has a mount sensor (not shown) configured to detect whether the portable memory is mounted thereto and to output a detection signal, which indicates that the portable memory is mounted, to the CPU 31. The mount sensor is implemented by an optical sensor, a mechanical sensor or a combination thereof, for example.

The CPU 31 is configured to control an overall operation of the MFP 10. The CPU 31 is configured to obtain and execute a variety of programs (which will be described later) from the memory 32, based on diverse signals to be output from the input I/F 24, a variety of information obtained from the external apparatus through the communication I/F 25, and the like. That is, the CPU 31 and the memory 32 configure an example of the controller.

In the memory 32, an OS 34 and an apparatus program 35 are stored. The memory 32 is an example of the apparatus memory. Incidentally, the apparatus program 35 may be a single program or a combination of a plurality of programs. Also, in the memory 32, data or information necessary to execute the apparatus program 35 is stored. The memory 32 may be a RAM, a ROM, an EEPROM, a HDD, a portable storage medium such as a USB memory to be detachably mounted to the MFP 10, a buffer of the CPU 31 or a combination thereof.

The memory 32 may be a computer-readable storage medium. The computer-readable storage medium is a non-transitory medium. The non-transitory medium includes a recording medium such as a CD-ROM and a DVD-ROM, in addition to the above-described medium. Also, the non-transitory medium is a tangible medium. Incidentally, an electric signal for carrying a program to be downloaded from the server on the Internet 101 is a computer-readable signal medium, which is one of the computer-readable media, but is not included in the non-transitory computer-readable storage medium.

The apparatus program 35 includes a program configured to implement an addition-type program function of the MFP 10. The addition-type program function is a function by which the CPU 31 enables the MFP 10 to execute an operation instructed by the instruction data. When a program record is recorded in a program list (which will be described later), the apparatus program 35 can enable the MFP 10 to execute an operation instructed by the instruction data through the addition-type program function. In the below, a plurality of instruction data to be used in the addition-type program function may also be referred to as "addition-type program."

The apparatus program 35 includes an analysis module 36, a first obtaining module 37 and a second obtaining module 38 so as to implement the addition-type program function. The analysis module 36, the first obtaining module 37 and the second obtaining module 38 may be functions, for example. Processing that is to be executed by the analysis module 36, the first obtaining module 37 and the second obtaining module 38 will be described in detail later. Also, the number of modules for implementing the addition-type program function is not limited to three. For example, the analysis module 36 may consist of a plurality of modules.

The module (hereinafter, referred to as "call source module") included in the apparatus program 35 is configured to designate information as an argument and to call another module (hereinafter, referred to as "called module"). Also, the called module is configured to obtain the information designated as the argument from the call source module. Also, the called module is configured to designate the information, which is to be transferred to the call source module, as a return value and to end the processing. The call source module is configured to obtain the information designated as the return value from the called module. Incidentally, the description "information is designated as the argument or the return value" means that the information itself is designated and that a pointer indicative of a head address of the memory 32 in which the information is stored is designated.

Also, the memory 32 may be configured to store therein a program list, as shown in FIG. 2B, for example. The program list includes one or more program records. The program record may be registered in advance upon shipment of the MFP 10 or may be registered by a user through the input I/F 24 or the communication I/F 25. The program record includes a program ID and location information corresponding to the program ID.

The program ID is information for identifying an addition-type program. The addition-type program is a program for enabling the MFP 10 to execute an operation including the content processing operation that is to be executed by the content processing unit. The location information is information for indicating a location of instruction data, which is to be first obtained, of a plurality of instruction data configuring the addition-type program to be identified by the program ID. A format of the location information is not particularly limited but may be a URL format, as shown in FIG. 2B, for example.

As an example, an addition-type program (hereinafter, referred to as "scan upload operation") to be identified by a program ID "scan upload" includes a plurality of instruction data for enabling the MFP 10 to execute an operation of transmitting scan data, which is to be generated by the scanner 12 during a scan operation, to the server through the communication I/F 25. That is, the scan upload operation includes a scan operation that is to be executed by the scanner 12 and an upload operation of transmitting the scan data to the server through the communication I/F 25.

As another example, an addition-type program (hereinafter, referred to as "download print operation") to be identified by a program ID "download print" includes a plurality of instruction data for enabling the MFP 10 to execute an operation in which the printer 11 records an image expressed by image data received from the server through the communication I/F 25 onto a sheet. That is, the download print operation includes a download operation of receiving image data from the server through the communication I/F 25 and a print operation to be executed by the printer 11.

XML files shown in FIGS. 3 and 4 are examples of the instruction data of a text format configuring the addition-type program. The instruction data is largely classified into screen instruction XMLs shown in FIGS. 3A, 3B, 4A and 4B and operation instruction XMLs shown in FIGS. 3C and 4C. The screen instruction XML is an example of screen instruction data for instructing the display 23 of the MFP 10 to display an instruction screen. The operation instruction XML is an example of operation instruction data for instructing execution of operations including the content processing operation.

Incidentally, the data format of the instruction data is not limited to the text format, and may be binary data, binarized text data, CSV format or unique format designed for the addition-type program function. The XML files shown in FIGS. 3 and 4 are stored in the servers 70, 80, the memory 32 or the USB memory mounted to the mounting unit 26. The servers 70, 80, the memory 32 and the USB memory are examples of the obtain source of the instruction data.

The server 70 is a so-called Web server configured to transmit the XML file by HTTP, for example. In this case, the location information has a URL format of "http://server identification information/file path information", for example. The server 80 is configured to store therein the XML file in conformity to a CIFS (abbreviation of Common Internet File System), for example, and to transmit the stored XML file to the MFP 10. In this case, the location information has a format of "file://server identification information/file path information", for example.

The server identification information is information for identifying the servers 70, 80 configured to store therein the instruction data. For example, the server 70 is identified by server identification information "www.server-a.com", and the server 80 is identified by server identification information "server-b". The file path information is information indicative of a location path of the instruction data. Also, the location information includes protocol information indicating a protocol for obtaining the instruction data. In the protocol information, a first value "http" indicating the HTTP, which is an example of a first protocol, or a second value "file" indicating the CIFS, which is an example of a second protocol, is set.

The specific examples of the first protocol and the second protocol are not limited thereto. Also, the protocol is not limited to the communication protocol. As another example of the protocol, the protocol may indicate whether the obtain source re-records the instruction data in accordance with a parameter designated by a user, as described later. As another example of the protocol, a protocol may be an access protocol to the memory 32 or the USB memory mounted to the mounting unit 26.

Also, the location information of the instruction data to be stored in the memory 32 or the USB memory mounted to the mounting unit 26 has a format of "file://localhost/drive letter/file path information", for example. "localhost" is information for identifying the MFP 10, which is an own apparatus, and may be included in the location information, instead of the server identification information. Incidentally, as the information for identifying an own apparatus, a loop-back address "127.0.0.1" may be used, instead of "localhost". Also, for example, the memory 32 is identified by a drive letter "a:", and the USB memory mounted to the mounting unit 26 is identified by a drive letter "c:".

The server identification information, "localhost" and the drive letter are examples of the memory identification information for identifying the memory connected to the MFP 10. Incidentally, a part or all of the server identification information, "localhost" and the drive letter may be omitted. When both the server identification information and "localhost" are omitted, it is handled in the same manner as a case where "localhost" is set. Also, when the drive letter is omitted, the obtain source of the instruction data is determined in accordance with a predetermined priority sequence.

The server 90 is a so-called storage server. The server 90 is configured to store the scan data transmitted from the MFP 10 in a server memory, for example. The server 90 is identified by server identification information "www.server-c.com".

Figure 5:
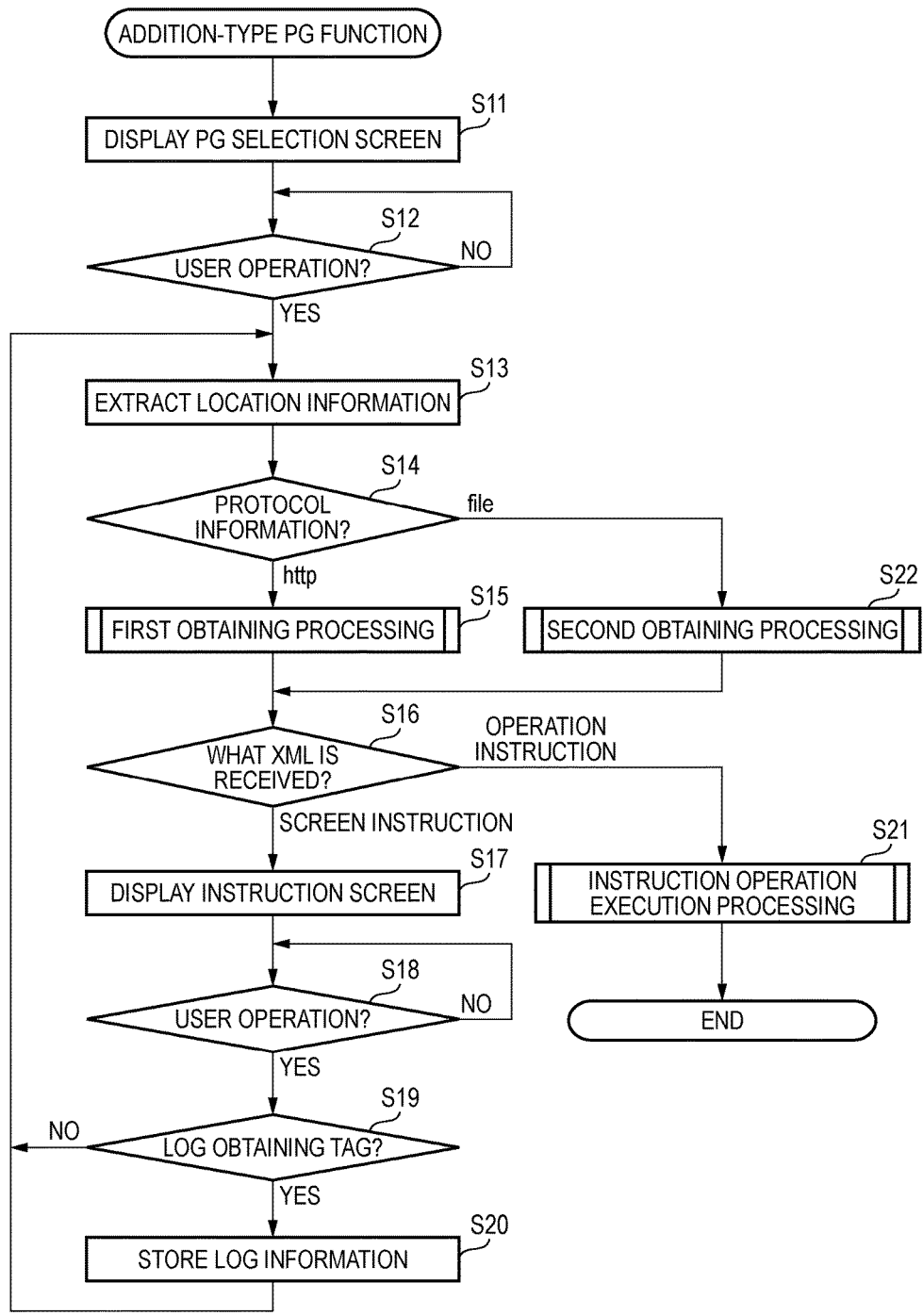
FIG. 5 is a flowchart of an addition-type program function.

Operations of the system 100 in accordance with the illustrative embodiment are described with reference to FIGS. 5 to 7.

A flowchart of the specification basically indicates processing of the CPU 31, which is to be executed in accordance with commands described in the program. That is, in the below descriptions, processing such as "determination", "extraction", "selection", "calculation", "decision", "specifying", "control" and the like indicates processing of the CPU 31. The processing that is to be executed by the CPU 31 includes hardware control via the OS 34, too. Also, in the specification, the term "data" is expressed by a computer-readable bit string. It is assumed that the data having the substantially same meaning and a different format is to be handled as the same data. This also applies to the "information" in the specification.

[Execution of Addition-Type Program Obtained from Server 70]

The apparatus program 35 executes the addition-type program in accordance with a user's instruction made through the input I/F 24, for example. In the below, the processing of executing the addition-type program is described in detail with reference to FIG. 5.

Figure 8A:
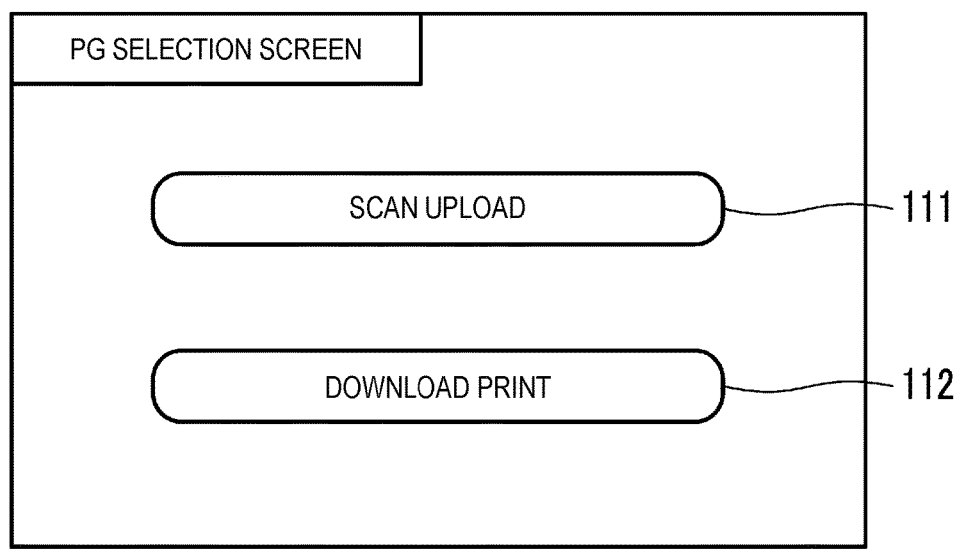

First, the apparatus program 35 displays a PG selection screen shown in FIG. 8A on the display 23 (S11). The PG selection screen is a screen for selecting one of a plurality of addition-type programs registered in the MFP 10. The PG selection screen includes program icons 111, 112. Each of the program icons 111, 112 corresponds to one of a plurality of program records registered in the program list. Then, the apparatus program 35 receives a user operation on the PG selection screen through the input I/F 24 (S12).

When the designation of the program icon 111 is received through the input I/F 24 (S12: Yes), for example, the apparatus program 35 executes the addition-type program identified by the program ID "scan upload". That is, the apparatus program 35 designates the program ID "scan upload" of the program record corresponding to the program icon 111, as the argument, and calls the analysis module 36.

Then, the analysis module 36 called by the apparatus program 35 obtains the program ID "scan upload" designated as the argument. Subsequently, the analysis module 36 reads out the location information "http://www.server-a.com/scan-upload1.xml" associated with the obtained program ID "scan upload" from the program list (S13). Then, the analysis module 36 determines a setting value of the protocol information included in the location information read in S13 (S14). The processing of S13 is an example of the extraction processing, and the processing of S14 is an example of the first determination processing.

Then, when it is determined that the first value "http" is set in the protocol information of the location information extracted in S13 (S14: http), the analysis module 36 executes first obtaining processing (S15). More specifically, the analysis module 36 designates the location information extracted in S13 as the argument, and calls the first obtaining module 37. The first obtaining processing is processing of obtaining the instruction data from the server 70 through the first obtaining module 37. The first obtaining processing is described in detail with reference to FIG. 6A.

First, the first obtaining module 37 called by the analysis module 36 obtains the location information designated as the argument from the analysis module 36. Then, the first obtaining module 37 transmits XML request information to the server 70 identified by the server identification information "www.server-a.com" of the obtained location information through the communication I/F 25, in accordance with the protocol described in the HTTP (S31). The XML request information is an example of the transmission request information for requesting transmission of an XML file to be identified by the file path information. The XML request information includes file path information "scan-upload1.xml" of the obtained location information, for example. The processing of S31 is an example of the transmission processing.

Incidentally, although not shown, the server 70 receives the XML request information from the MFP 10. Then, the server 70 transmits an XML file shown in FIG. 3A to the MFP 10, as the XML file identified by the file path information "scan-upload1.xml".

Then, the first obtaining module 37 receives the XML file shown in FIG. 3A, as a response to the XML request information transmitted in S31, from the server 70 through the communication I/F 25, in accordance with the protocol described in the HTTP (S32: Yes). Then, the first obtaining module 37 temporarily stores the XML file received in S32 in the memory 32. Subsequently, the first obtaining module 37 designates the XML file received in S32 as the return value to transfer the XML file to the analysis module 36 (S33), and ends the first obtaining processing. The processing of S32 is an example of the reception processing, and the processing of S33 is an example of the first transfer processing.

Then, returning to FIG. 5, the analysis module 36 obtains the XML file designated as the return value from the first obtaining module 37. Then, the analysis module 36 determines whether the obtained XML file is the screen instruction XML or the operation instruction XML (S16). More specifically, the analysis module 36 searches a <screen> tag and a <command> tag in the XML file. Then, when the <screen> tag is detected, the analysis module 36 determines that the XML file shown in FIG. 3A is the screen instruction XML (S16: screen instruction). The processing of S16 is an example of the second determination processing.

The screen instruction XML includes a <next_url> tag, a <title> tag, a <option_display> tag, a plurality of <option> tags as elements of the <screen> tag, as shown in FIG. 3A, for example. In an element of the <next_url> tag, the location information of the instruction data, which is to be obtained after an operation instructed in the screen instruction XML is executed, is set. In an element of the <title> tag, a character string of a screen title of the instruction screen is set.

In an attribute "key" of the <option_display> tag, an item ID "resolution" for identifying a parameter item "resolution", which is to be designated by a user through the instruction screen instructed by the screen instruction XML, is set. In an element of the <option> tag, texts "300 dpi" and "600 dpi", which indicate parameters to be designated by the user, are set. In an attribute "val" of the <option> tag, parameter values "1" and "2", which are to be designated by the user, are set. That is, the <option> tag corresponds to a parameter candidate that is to be selected by the user through the instruction screen.

Figure 8B:
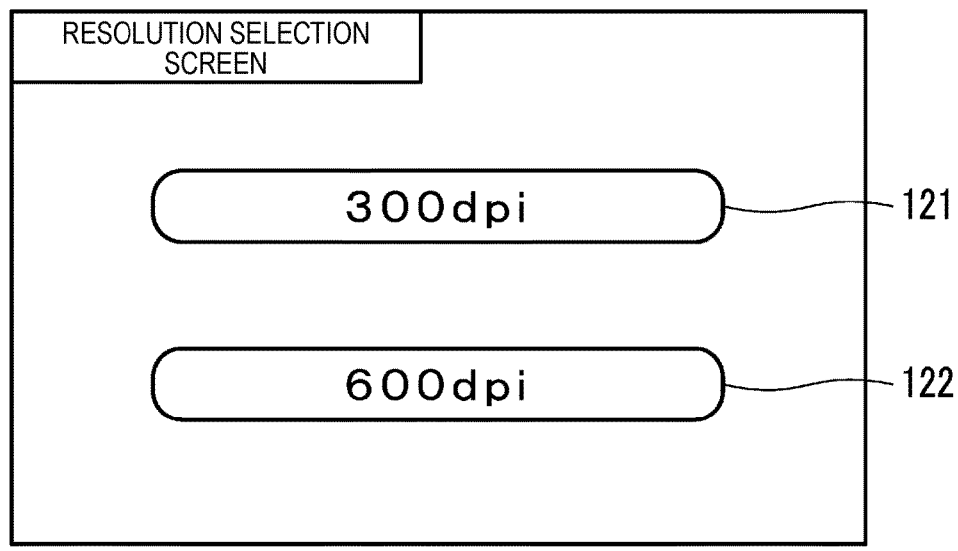

When it is determined that the obtained XML file is the screen instruction XML (S16: screen instruction), the analysis module 36 displays a resolution selection screen shown in FIG. 8B on the display 23 in accordance with the elements of the <screen> tag (S17). The resolution selection screen is an example of the instruction screen for enabling the user to designate a parameter corresponding to the item ID "resolution". Then, the analysis module 36 receives a user operation on the instruction screen through the input I/F 24 (S18). The processing of S17 is an example of the display processing, and the processing of S18 is an example of the receiving processing.

The resolution selection screen includes parameter icons 121, 122 corresponding to the plurality of <option> tags. In the parameter icons 121, 122, texts, which are elements of the corresponding <option> tags, are described. Incidentally, the parameter of the item ID "resolution" is an example of the parameter indicative of the execution condition of the scan upload. More specifically, the parameter of the item ID "resolution" is an example of the parameter indicative of a reading resolution of the scan operation that is to be executed by the scanner 12.

Then, when the designation of the parameter icon 122 is received through the input I/F 24 (S18: Yes), for example, the analysis module 36 temporarily stores the attribute value val="2" of the <option> tag associated with the parameter icon 122 in the memory 32, as the parameter of the item ID "resolution" designated by the user.

Then, the analysis module 36 determines whether the screen instruction XML shown in FIG. 3A includes a <log_obtaining/> tag (S19). The <log_obtaining/> tag is a tag for instructing the parameter "2" designated in the just previous processing of S18 to be stored in the memory 32, as log information. When it is determined that the screen instruction XML shown in FIG. 3A does not include the <log_obtaining/> tag (S19: No), the analysis module 36 skips over processing of S20 and executes the processing of S13 and thereafter.

Incidentally, the storing instruction of the log information is not limited to the <log_obtaining/> tag. As another example, the storing instruction of the log information may an instruction in which a script file for executing processing of storing the log information in a preset memory (for example, a USB memory) is stored. The analysis module 36 may be configured to store the log information by executing the script file. As another example, the analysis module 36 may be configured to execute the processing of S20 all the time.

Then, the analysis module 36 extracts the element of <next_url>, i.e., "http://www.server-a.com/scan-upload2.xml", as the location information of next instruction data, from the screen instruction XML shown in FIG. 3A (S13). Then, when it is determined that the first value "http" is set in the protocol information of the location information extracted in S13 (S14: http), the analysis module 36 executes the first obtaining processing (S15). Meanwhile, in the first obtaining processing that is to be executed after the processing of S18 is executed, the analysis module 36 designates the parameter "2" of the item ID "resolution" designated in S18 as the argument, in addition to the location information extracted in S13, and calls the first obtaining module 37.

Then, the first obtaining module 37 called by the analysis module 36 obtains the location information and parameter designated as the argument from the analysis module 36. Then, the first obtaining module 37 transmits the XML request information to the server 70 identified by the server identification information "www.server-a.com" of the obtained location information through the communication I/F 25 (S31). Incidentally, in the processing of S31 that is to be executed when the parameter is obtained as the argument, the first obtaining module 37 transmits the XML request information including the obtained parameter "resolution=2", in addition to the file path information "scan-upload2.xml".

Incidentally, although not shown, when the XML request information including the file path information and the parameter is received, the server 70 stores the parameter "resolution=2" in the server memory. Then, the server 70 reads out the XML file identified by the file path information "scan-upload2.xml" from the server memory. Then, the server 70 adds the parameter "?resolution=2" included in the XML request information to a tail of the element of <next_url> of the read XML file. Then, the server 70 transmits an XML file shown in FIG. 3B to the MFP 10.

Then, the first obtaining module 37 receives the XML file shown in FIG. 3B from the server 70 through the communication I/F 25 (S32: Yes). Then, the first obtaining module 37 temporarily stores the XML file received in S32 in the memory 32. Subsequently, the first obtaining module 37 designates the XML file received in S32 as the return value, and ends the first obtaining processing.

Figure 9A:
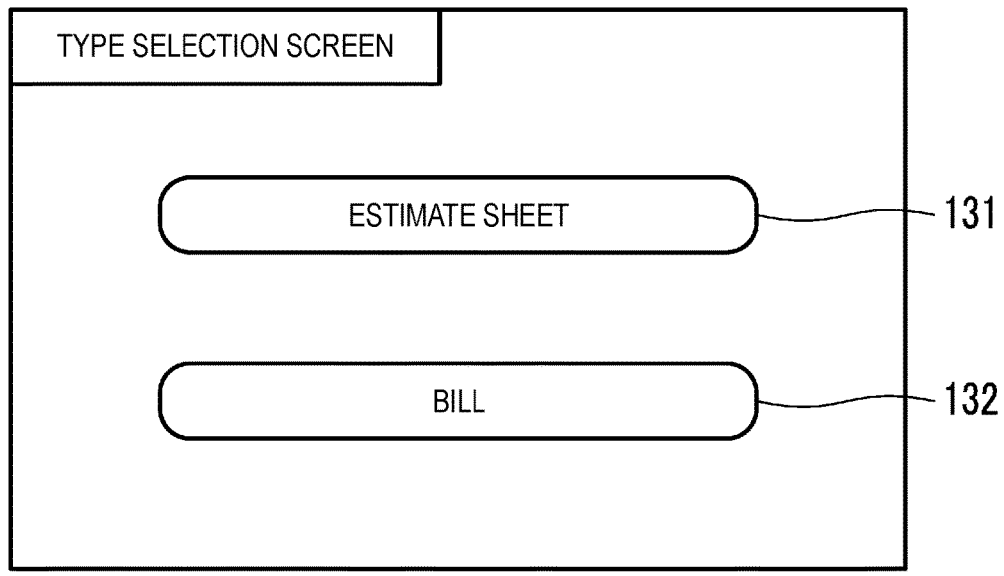

Then, returning to FIG. 5, the analysis module 36 obtains the XML file designated as the return value from the first obtaining module 37. Then, when it is determined that the XML file shown in FIG. 3B is the screen instruction XML (S16: screen instruction), the analysis module 36 displays a type selection screen shown in FIG. 9A on the display 23 in accordance with the elements of the <screen> tag (S17). The type selection screen is an example of the instruction screen for instructing the user to designate a parameter corresponding to an item ID "file_type".

The resolution selection screen includes parameter icons 131, 132 corresponding to the plurality of <option> tags. The parameter of the item ID "file_type" indicates a type (for example, "estimate sheet", "bill") of a document to be read by the scanner 12. That is, the parameter of the item ID "file_type" is not information directly indicating an execution condition of the scan upload operation. However, the execution condition of the scan upload operation may be changed depending on the parameter of the item ID "file_type", as described later. Like this, the screen instruction XML is preferably configured to enable the user to designate a parameter directly or indirectly indicating an execution condition of an operation to be instructed by a subsequent operation instruction XML.

Then, when the designation of the parameter icon 131 is received through the input I/F 54 (S18: Yes), for example, the analysis module 36 temporarily stores the attribute value val="1" of the <option> tag associated with the parameter icon 131 in the memory 32, as the parameter of the item ID "file_type" designated by the user. Then, when it is determined that the screen instruction XML does not include the <log_obtaining/> tag shown in FIG. 3B (S19: No), the analysis module 36 skips over the processing of S20, and extracts the element of <next_url>, i.e., "http://www.server-a.com/scan-upload3.xml?resolution=2", as the location information of next instruction data, from the screen instruction XML shown in FIG. 3B (S13).

Then, when it is determined that the first value "http" is set in the protocol information of the location information extracted in S13 (S14: http), the analysis module 36 designates the location information extracted in S13 and the parameter "1" of the item ID "file_type" designated in S18, as the argument, and calls the first obtaining module 37 (S15). Then, the first obtaining module 37 transmits the XML request information including the file path information "scan-upload3.xml" and the parameter "file_type=1" to the server 70 through the communication I/F 25.

Incidentally, although not shown, the server 70 stores the parameter "file_type=1" included in the XML request information received from the MFP 10, in the server memory. Then, the server 70 generates an XML file shown in FIG. 3C, as the XML file to be identified by the file path information "scan-upload3.xml". Then, the server 70 transmits the generated XML file to the MFP 10.

More specifically, the server 70 sets a reading resolution "600 dpi", which corresponds to the parameter "resolution=2" stored in the server memory, in an element of the <resolution> tag. Also, the server 70 sets a file format "PDF", which corresponds to the parameter "file_type=1" stored in the server memory, in an element of a <format> tag. Incidentally, the server identification information "ftp://www.server-c.com" of the upload destination of the scan data is fixedly set in an element of a <server> tag. The <resolution> tag, the <format> tag and the <server> tag indicate the execution conditions of the scan upload operation.

Incidentally, although not shown, when the parameter "resolution=1" is stored in the server memory, a reading resolution "300 dpi" is set in the element of the <resolution> tag, for example. Also, when the parameter "file_type=2" is stored in the server memory, a file format "TIFF" is set in the element of the <format> tag, for example. That is, the server 70 sets the parameters indicative of the execution conditions in the XML file in accordance with the parameters designated in S18. In other words, the XML file shown in FIG. 3C indicates the execution conditions corresponding to the parameters included in the XML request information.

Then, the first obtaining module 37 obtains the XML file shown in FIG. 3C from the server 70 through the communication I/F 25 (S32: Yes), temporarily stores the obtained XML file in the memory 32, and transfers the same to the analysis module 36, as the return value (S33). Then, when the <command> tag is detected in the XML file obtained as the return value, the analysis module 36 determines that the corresponding XML file is the operation instruction XML (S16: operation instruction). Then, the analysis module 36 executes instruction operation execution processing (S21). The instruction operation execution processing is processing of executing an instruction operation instructed by the operation instruction XML. The instruction operation execution processing is described in detail with reference to FIG. 6B.

First, the analysis module 36 determines whether the operation instruction XML shown in FIG. 3C includes a <script> tag (S36). When it is determined that the operation instruction XML does not include the <script> tag (S36: No), the analysis module 36 skips over processing of S37 and executes the instruction operation (S38). The processing of S36 is an example of the third determination processing, and the processing of S38 is an example of the operation instruction processing.

That is, the analysis module 36 executes the scan upload operation in accordance with the execution conditions indicated by the elements of the <resolution> tag, the <format> tag and <the_server> tag shown in FIG. 3C. In other words, the analysis module 36 executes the scan upload operation in accordance with the execution conditions corresponding to the parameters designated in S18. More specifically, the analysis module 36 enables the scanner 12 to execute the scan operation of reading a document with the reading resolution "600 dpi" and generating scan data of the file format "PDF". Then, the analysis module 36 transmits the scan data to the server 90 identified by the server identification information "www.server-c.com" through the communication I/F 25, in accordance with the protocol conforming to the FTP.

[Registration/Edition of Program Record]

Figure 9B:
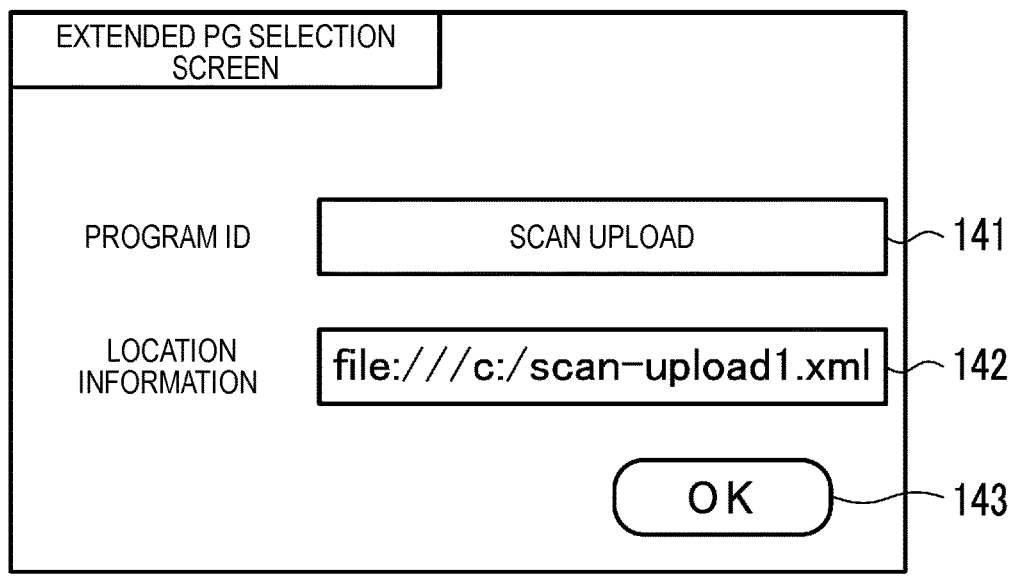

Also, the apparatus program 35 can receive a user operation of newly adding a program record to the program list or a user operation of editing the program record registered already in the program list, through an extended PG setting screen shown in FIG. 9B, for example.

The extended PG setting screen includes text boxes 141, 142, and an [OK] icon 143. In the text box 141, a program ID input through the input I/F 24 is displayed. In the text box 142, location information input through the input I/F 24 is displayed. When the designation of the [OK] icon 143 shown in FIG. 9B is received through the input I/F 24, the apparatus program 35 determines whether the program record including the program ID "scan upload" displayed in the text box 141 has been already registered in the program list.

When it is determined that the program record including the program ID "scan upload" has been already registered, the apparatus program 35 overwrites the corresponding location information "http://www.server-a.com/scan-upload1.xml" with the location information "file:///c:/scan-upload1.xml" displayed in the text box 142. On the other hand, when it is determined that the program record including the program ID displayed in the text box 141 has not been registered, the apparatus program 35 newly registers the program record including the program ID and location information displayed in the text boxes 141, 142, in the program list.

[Execution of Addition-Type Program Obtained from Obtain Source Different from Server 70]

Subsequently, processing, which is to be executed when the program icon 111 associated with the program record including the location information "file:///c:/scan-upload1.xml" is designated on the PG selection screen shown in FIG. 8A, is described. Incidentally, the detailed descriptions of the common points to the above-described processing are omitted, and the differences are mainly described.

First, the analysis module 36 called by the apparatus program 35 reads out the location information "file:///c:/scan-upload1.xml" associated with the program ID "scan upload" designated as the argument from the program list (S13). Then, when it is determined that the second value "file" is set in the protocol information of the location information read in S13 (S14: file), the analysis module 36 executes second obtaining processing (S22). More specifically, the analysis module 36 designates the location information extracted in S13 as the argument, and calls the second obtaining module 38. The second obtaining processing is processing of obtaining the instruction data from the obtain source through the second obtaining module 38. The second obtaining processing is described in detail with reference to FIG. 7.

First, the second obtaining module 38 called by the analysis module 36 obtains the location information "file:///c:/scan-upload1.xml" designated as the argument. Then, the second obtaining module 38 determines whether the obtained location information includes the server identification information or the drive letter (S41, S43). The processing of S41 and S43 is an example of the fourth determination processing. Incidentally, when the location information includes "localhost", the second obtaining module 38 determines that the location information does not include the server identification information (S41: No) and executes processing of S43 and thereafter.

Then, when it is determined that the obtained location information does not include the server identification information and includes the drive letter "c:" (S41: No & S43: Yes), the second obtaining module 38 reads out an XML file shown in FIG. 4A from the USB memory mounted to the mounting unit 26 identified by the drive letter "c:", as the XML file identified by the file path information "scan-upload1.xml", in accordance with the access protocol to the USB memory (S44). The processing of S44 and S42, S46 and S47 to be described later is an example of the obtaining processing. Then, the second obtaining module 38 temporality stores the XML file read in S44 in the memory 32 and then designates the XML file read in S44, as the return value (S48), and ends the second obtaining processing. The processing of S48 is an example of the second transfer processing.

Then, returning to FIG. 5, the analysis module 36 obtains the XML file designated as the return value from the second obtaining module 38. Since the processing of S16 to S18 for the XML file shown in FIG. 4A is the same as the processing for the XML file shown in FIG. 3A, the detailed descriptions are omitted, assuming that the parameter icon 122 is designated.

Then, when it is determined that the screen instruction XML shown in FIG. 4A includes the <log_obtaining/> tag (S19: Yes), the analysis module 36 stores the <resolution> tag and a parameter "2", which is an element of the <resolution> tag, in the memory 32, as elements of a <evtparam> tag, as shown in FIG. 4D, for example (S20). The <resolution> tag corresponds to the item ID "resolution". The parameter "2", which is the element of the <resolution> tag, is a parameter designated with being associated with the item ID "resolution" by the user. The processing of S20 is an example of the storing processing.

Then, the analysis module 36 extracts "file://localhost/scan-upload2.xml", which is an element of <next_url>, from the screen instruction XML shown in FIG. 4A, as the location information of next instruction data (S13). Then, when it is determined that the second value "file" is set in the protocol information of the location information extracted in S13 (S14: file), the analysis module 36 executes the second obtaining processing (S22). Incidentally, in the second obtaining processing after the execution of S18, the analysis module 36 designates the parameter "2" of the item ID "resolution" designated in S18 as the argument, in addition to the location information extracted in S13, and calls the second obtaining module 38.

Then, the second obtaining module 38 called by the analysis module 36 obtains the location information and parameter designated as the argument from the analysis module 36. Then, when it is determined that the obtained location information includes "localhost" and does not include the drive letter (S41: No & S43: No), the second obtaining module 38 determines whether the USB memory is mounted to the mounting unit 26 (S45). That is, the second obtaining module 38 determines whether a detection signal is output from the mount sensor. The processing of S45 is an example of the fifth determination processing.

When it is determined that the USB memory is mounted (S45: Yes), for example, the second obtaining module 38 reads out an XML file shown in FIG. 4B from the USB memory mounted to the mounting unit 26, as the XML file identified by the file path information "scan-upload2.xml", in accordance with the access protocol to the USB memory (S46). Then, the second obtaining module 38 designates the XML file read in S46 as the return value (S48), and ends the second obtaining processing. Incidentally, the second obtaining module 38 may be configured not to use the parameter obtained as the argument, in the second obtaining processing. That is, the parameter is designated to make the arguments of the first obtaining module 37 and the second obtaining module 38 common and may not be used in the second obtaining processing.

Then, returning to FIG. 5, the analysis module 36 obtains the XML file designated as the return value from the second obtaining module 38. Since the processing of S16 to S18 for the XML file shown in FIG. 4B is the same as the processing for the XML file shown in FIG. 3B, the detailed descriptions are omitted, assuming that the parameter icon 131 is designated.

Then, when it is determined that the screen instruction XML shown in FIG. 4B includes the <log_obtaining/> tag (S19: Yes), the analysis module 36 stores a <file_type> tag and a parameter "1", which is an element of the <file_type> tag, in the memory 32, as the elements of the <evtparam> tag, as shown in FIG. 4D, for example (S20). The <file_type> tag corresponds to the item ID "file_type". The parameter "1", which is the element of the <file_type> tag, is a parameter designated with being associated with the item ID "file_type" by the user.

Then, the analysis module 36 extracts "file:///scan-upload3.xml", which is an element of <next_url>, from the screen instruction XML shown in FIG. 4B, as the location information of next instruction data (S13). Then, when it is determined that the second value "file" is set in the protocol information of the location information extracted in S13 (S14: file), the analysis module 36 designates the location information extracted in S13 and the parameter "1" of the item ID "file_type" designated in S18 as the argument, and calls the second obtaining module 38 (S22).

Then, the second obtaining module 38 called by the analysis module 36 obtains the location information and parameter designated as the argument from the analysis module 36. Then, when it is determined that the obtained location information does not include the server identification information and the drive letter (S41: No & S43: No), the second obtaining module 38 determines whether the USB memory is mounted to the mounting unit 26 (S45).

When it is determined that the USB memory is not mounted (S45: No), for example, the second obtaining module 38 reads out an XML file shown in FIG. 4C from the memory 32, as the XML file identified by the file path information "scan-upload3.xml", in accordance with the access protocol to the memory 32 (S47). Then, the second obtaining module 38 designates the XML file read in S47 as the return value (S48), and ends the second obtaining processing.

Incidentally, although descriptions of a specific example are omitted, when it is determined that the obtained location information includes the server identification information "server-b" (S41: Yes), the second obtaining module 38 obtains the XML file from the server 80 identified by the server identification information "server-b" (S42). That is, the second obtaining module 38 transmits the XML request information to the server 80 through the communication I/F 25 and receives the XML file from the server 80 through the communication I/F 25, in accordance with the protocol indicated in the CIFS. Also, when it is determined that the obtained location information includes the drive letter "a:" (S43: Yes), the second obtaining module 38 reads out the XML file from the memory 32 identified by the drive letter "a:", in accordance with the protocol indicated in the CIFS (S44).

Then, when it is determined that the XML file obtained as the return value from the second obtaining module 38 is the operation instruction XML (S16: operation instruction), the analysis module 36 executes the instruction operation execution processing (S21). Meanwhile, in the operation instruction XML shown in FIG. 4C, the execution conditions (for example, the reading resolution, the file format), which are to be changed depending on the parameters designated in S18, are not set, and the execution condition to be fixedly set (for example, the server identification information) is set. Also, the operation instruction XML shown in FIG. 4C includes the <script> tag. When it is determined that the operation instruction XML shown in FIG. 4C includes the <script> tag (S36: Yes), the analysis module 36 executes a script, which is an element of the <script> tag (S37).

The script set in the element of the <script> tag defines processing of converting a parameter stored in the memory 32 as an element of <evtparam> into the execution condition of the scan upload operation. Although a specific example of a script language is not particularly limited, Lua, Ruby, JavaScript (registered trademark) and the like may be used, for example. The analysis module 36 replaces the <script> tag with a tag indicative of the execution condition converted in accordance with the script. The processing of S37 is an example of the replacement processing.

In the examples of FIGS. 4C and 4D, a first <script> tag is replaced to "<resolution>600 dpi</resolution>", and a second <script> tag is replaced to "<format>PDF</format>". That is, the operation instruction XML shown in FIG. 4C is replaced to the operation instruction XML shown in FIG. 3C. Then, the analysis module 36 executes an instruction operation indicated by the replaced operation instruction XML (S38).

[Operational Effects of Illustrative Embodiment]

According to the illustrative embodiment, it is possible to obtain the XML files from the obtain sources different from each other by the first obtaining module 37 and the second obtaining module 38, which are to be called by designating the common argument. The analysis module 36 may be configured to execute the common processing for the XML files obtained in the first obtaining processing and the second obtaining processing. In this way, the protocols different for each of the obtain sources are mounted on the obtaining modules 37, 38 and the common processing of analyzing the XML files is mounted on the analysis module 36, so that it is possible to implement the MFP 10 capable of obtaining the XML files from the plurality of obtain source at the low development cost.

Also, according to the illustrative embodiment, the second obtaining module 38 can be configured to obtain the XML file from the memory, which is to be identified by the memory identification information, of the plurality of memories connected to the MFP 10. Thereby, the variation of the preservation destination of the XML file increases and the development cost of the apparatus program 35 is further saved. Also, a priority order (for example, an order of the mounting unit 26 and the memory 32) of the obtain sources of the XML file is preset, so that the memory identification information can be omitted from the location information. Therefore, it is possible to reduce the development burden on the XML file for implementing the addition-type program.

Also, according to the illustrative embodiment, the server 70 is configured to set the execution condition corresponding to the parameter designated by the user in the operation instruction XML that is to be obtained by the first obtaining module 37. Meanwhile, the analysis module 36 is configured to set the execution condition corresponding to the parameter designated by the user in the operation instruction XML that is to be obtained by the second obtaining module 38, in accordance with the script. Thereby, even when the operation instruction XML is obtained from any one of the obtain source (for example, the server 70) having a function of re-recording the operation instruction XML and the obtain source (for example, the server 80, the memory 32, the mounting unit 26) having no function of re-recording the operation instruction XML, it is possible to execute the scan upload operation in accordance with the appropriate execution condition.

The execution of S20, S36 and S37 is not limited to the analysis module 36 and may be performed by the second obtaining module 38. That is, the second obtaining module 38 may be configured to execute the processing of S20, S36 and S38 in the second obtaining processing. More specifically, the second obtaining module 38 stores the parameter obtained as the argument in the memory 32, as the log information (S20). Also, the second obtaining module 38 executes the processing of S36 and S38 before the processing of S48. Then, the second obtaining module 38 transfers the operation instruction XML in which the <script> tag has been replaced to the execution condition to the analysis module 36 (S48).

Also, according to the illustrative embodiment, the examples where all the XML files for implementing the scan upload operation are obtained from the server 70 and are obtained from the obtain source other than the server 70 have been described. However, the combination of the obtain sources of the XML files is not limited thereto. That is, the location information including the memory identification information of the server 80, the memory 32 or the mounting unit 26 may be set in the element of <next_url> of the XML file stored in the server 70. Likewise, the location information including the server identification information of the server 70 may be set in the element of <next_url> of the XML file stored in the server 80, the memory 32 or the USB memory.

Also, in the examples of FIGS. 3 and 4, the <next_url> tag is included only in the screen instruction XML and is not included in the operation instruction XML. However, the <next_url> tag may be included in the operation instruction XML. That is, the MFP 10 may be configured to further execute an operation after an operation instructed in the operation instruction XML. Incidentally, the element of the <next_url> tag included in the operation instruction XML may indicate the screen instruction XML or the operation instruction XML.

As an example, the MFP 10 may be configured to further execute the scan operation in accordance with the same or different execution parameter, after the operation instruction XML of FIG. 3C or 4C. As another example, the printer 11 may be configured to execute the print operation of recording an image indicative of a result of the scan upload on a sheet, after the operation instruction XML of FIG. 3C or 4C. As another example, a screen indicative of a result of the scan upload may be displayed on the display 23, after the operation instruction XML of FIG. 3C or 4C.

Also, in the MFP 10 of the illustrative embodiment, the diverse programs stored in the memory 32 are executed by the CPU 31, so that the respective processing to be executed by the controller of the disclosure is implemented. However, the configuration of the controller is not limited thereto, and the controller may be partially or entirely configured by the hardware such as an integrated circuit.

Also, the disclosure can be implemented not only as the MFP 10 but also as a program for enabling the MFP 10 to execute the processing. The program may be provided with being recorded in a non-transitory recording medium. The non-transitory recording medium may include not only a CD-ROM, a DVD-ROM and the like but also a memory mounted on a server that can be connected to the MFP 10 through the communication network. The program stored in the memory of the server may be distributed as information or signals indicative of the program, through the communication network such as the Internet.

What is claimed is:

1. A content processing apparatus comprising:
a content processing device, which is hardware configured to execute a content processing operation for content data;
a display;
an input interface;
a communication interface;
a controller; and
an apparatus memory storing therein a program which, when executed by the controller, causes the content processing apparatus to perform:
extracting location information indicative of a location of instruction data;
determining a setting value of protocol information included in the extracted location information;
obtaining the instruction data comprising:
when it is determined that the setting value of the protocol information is a first value, obtaining the instruction data indicated by the extracted location information; and
when it is determined that the setting value of the protocol information is a second value, obtaining the instruction data indicated by the extracted location information; and
determining whether the obtained instruction data is screen instruction data or operation instruction data, the screen instruction data being for displaying an instruction screen including a plurality of parameters, and the operation instruction data being for instructing the content processing device to execute the content processing operation,
wherein when it is determined that the obtained instruction data is the screen instruction data, the program, when executed by the controller, is configured to:
cause the content processing apparatus to perform:
displaying the instruction screen expressed by the screen instruction data on the display;
receiving a user operation of designating one of the plurality of parameters included in the instruction screen through the input interface;
extracting the location information indicative of a location of next instruction data from the obtained instruction data; and
obtain the instruction data indicated by the location information by using the extracted location information and the designated parameter, in the obtaining of the instruction data after performing the receiving of the user operation,
wherein when it is determined that the obtained instruction data is the operation instruction data, the program, when executed by the controller, causes the content processing apparatus to perform:

causing the content processing device to perform the content processing operation indicated by the operation instruction data, in accordance with an execution condition corresponding to the parameter designated by the user operation, wherein in the obtaining of the instruction data when the determined setting value of the protocol information is the first value, the program, when executed by the controller, causes the content processing apparatus to perform:

transmitting transmission request information to a server through the communication interface in accordance with a first protocol, the transmission request information requesting transmission of the instruction data indicated by the location information, the transmission request information in the obtaining of the instruction data after performing the receiving of the user operation comprising the parameter; and receiving the instruction data, which is a response to the transmission request information, from the server through the communication interface in accordance with the first protocol, so as to obtain the instruction data indicated by the location information, and wherein in the obtaining of the instruction data when the determined setting value of the protocol information is the second value, the program, when executed by the controller, causes the content processing apparatus to perform:

obtaining the instruction data indicated by the location information from an obtain source different from the server in accordance with a second protocol, the second protocol being different from the first protocol.

2. The content processing apparatus according to claim 1, wherein in the receiving of the instruction data, the program, when executed by the controller, receives the operation instruction data of instructing the execution condition corresponding to the parameter included in the transmission request information from the server through the communication interface, and wherein in the causing of the content processing device to perform the content processing operation, the program, when executed by the controller, causes the content processing device to perform the content processing operation in accordance with the execution condition instructed by the operation instruction data.

3. The content processing apparatus according to claim 2, wherein in the obtaining of the instruction data from the obtain source, the program, when executed by the controller, obtains the operation instruction data including a script from the obtain source, the script being for converting the parameter designated by the user operation into the execution condition, and wherein the program, when executed by the controller, further causes the content processing apparatus to perform:

storing the parameter designated by the user operation into the apparatus memory;

determining whether the operation instruction data includes the script; and when it is determined that the operation instruction data includes the script, replacing the script of the operation instruction data by the execution condition converted from the parameter stored in the apparatus memory in accordance with the script.

4. The content processing apparatus according to claim 2, wherein in the obtaining of the instruction data from the obtain source, the program, when executed by the controller, obtains the operation instruction data including a script from the obtain source, the script being for converting the parameter designated in the by the user operation into the execution condition, and wherein in the obtaining of the instruction data when the determined setting value of the protocol information is the second value, the program, when executed by the controller, further causes the content processing apparatus to perform:

storing the parameter in the apparatus memory;

determining whether the operation instruction data obtained in the obtaining of the instruction data includes the script; and when it is determined that the operation instruction data includes the script, replacing the script of the operation instruction data by the execution condition converted from the parameter stored in the apparatus memory in accordance with the script.

5. The content processing apparatus according to claim 2, wherein the program, when executed by the controller, further causes the content processing apparatus to perform:

storing the parameter in the apparatus memory, wherein in the obtaining of the instruction data from the obtain source, the program, when executed by the controller, obtains the operation instruction data including a script from the obtain source, the script being for converting the parameter designated in the reception processing into the execution condition, and wherein in the obtaining of the instruction data when the determined setting value of the protocol information is the second value, the program, when executed by the controller, further causes the content processing apparatus to perform:

determining whether the operation instruction data obtained in the obtaining processing includes the script; and a replacement processing of, when it is determined that the operation instruction data includes the script, replacing the script of the operation instruction data by the execution condition converted from the parameter stored in the apparatus memory in accordance with the script.

6. The content processing apparatus according to claim 1, wherein the content processing apparatus is connected to a plurality of memories, which are the obtain sources, wherein the location information in which the second value is set in the protocol information can comprise memory identification information of identifying one of the plurality of memories, and wherein in the obtaining of the instruction data when the determined setting value of the protocol information is the second value, the program, when executed by the controller, causes the content processing apparatus to perform:

determining whether the location information includes the memory identification information; and when it is determined that the location information comprises the memory identification information, in the obtaining processing, reading out the instruction data from the memory identified by the memory identification information.

7. The content processing apparatus according to claim 6, wherein the content processing apparatus comprises a mounting interface configured to receive a portable memory, and wherein in the obtaining of the instruction data when the determined setting value of the protocol information is the second value, the program, when executed by the controller, causes the content processing apparatus to further perform:

when it is determined in the fourth determination processing that the location information does not comprise the memory identification information, determining whether the portable memory is mounted to the mounting interface;

when it is determined that the portable memory is mounted to the mounting interface, reads out the instruction data from the portable memory; and when it is determined that the portable memory is not mounted to the mounting interface, reads out the instruction data from the apparatus memory.

8. The content processing apparatus according to claim 1, wherein the content data is image data, and wherein the content processing device is a scanner configured to execute a scan operation of reading image data recorded on a document and generating the image data.

9. The content processing apparatus according to claim 1, wherein the content data is image data, and wherein the content processing device is a printer configured to execute a print operation of forming an image expressed by image data on a sheet.

10. The content processing apparatus according to claim 1, wherein the content data is image data, and wherein the content processing device is a multi-function device comprising:

a scanner configured to execute a scan operation of reading image data recorded on a document and generating the image data; and a printer configured to execute a print operation of forming an image expressed by the image data on a sheet.

* * * * *